June 24, 1969  A. R. MOAT  3,451,638
FISHING REEL
Filed June 13, 1966
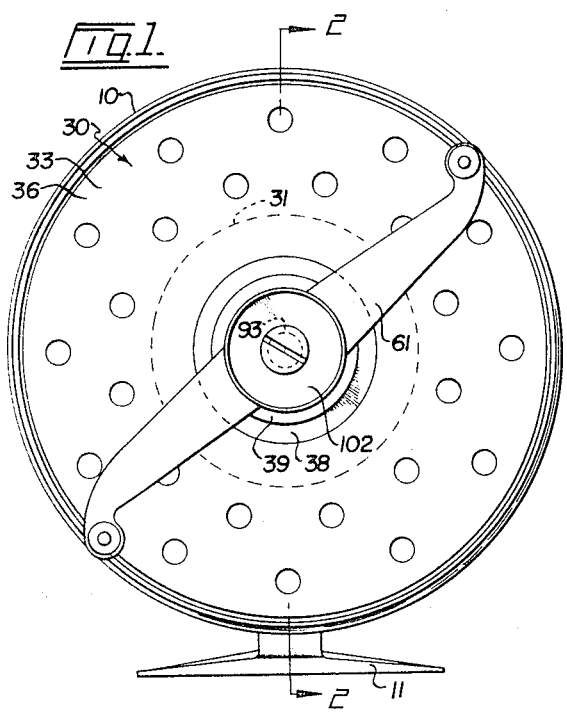
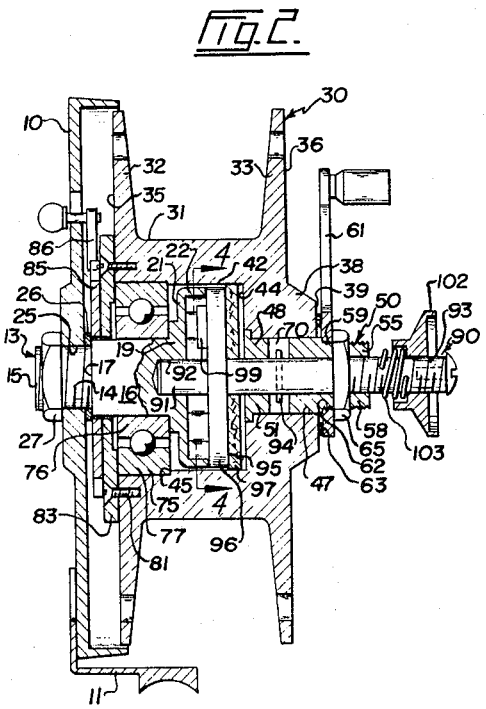
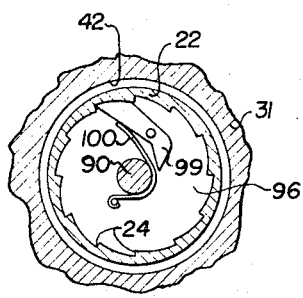
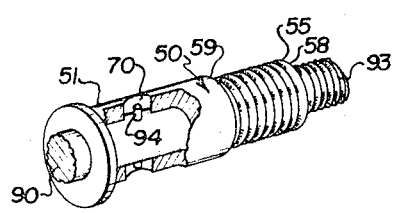
INVENTOR
ARTHUR R. MOAT
BY
Featherstonhaugh & Co.
ATTORNEYS

United States Patent Office 3,451,638
Patented June 24, 1969

3,451,638
FISHING REEL
Arthur R. Moat, 932 Stanton Ave., Coquitlam,
New Westminster, British Columbia, Canada
Filed June 13, 1966, Ser. No. 557,235
Int. Cl. A01k *89/02, 89/00*
U.S. Cl. 242—84.45
6 Claims

ABSTRACT OF THE DISCLOSURE

A fishing reel having a spool journalled for rotation upon a boss projecting from a frame. The spool is frictionally engageable by and driven in one direction by a frictional element nonrotatably carried on an axially adjustable drive shaft which is slidably and rotatably connected to the boss for one way rotatable movement only.

---

This invention relates to fishing reels and more particularly to reels which are employed in fishing for large game fish.

In view of the weight of large game fish and their propensity to fight the pull of the line, the reels must permit the angler to play the fish until it is tired before commencing to reel it in. Usually when a large game fish is initially struck it will invariably fight the line with considerable strength, and it is therefore necessary to apply a constant braking force to the reel which will permit the line to pay out against the fight of the fish yet which also has sufficient straining force to tire the latter. At the same time, whenever the angler has the advantage, it is necessary for him to take in as much line as he can. Reels for this purpose have been constructed in the past by means of which the spool may be frictionally engaged by a brake. However, when the fish is taking out the line, the handles normally attached to the spool rotate very rapidly and the process of setting the brake to provide the desired tension on the line often results in injury to the hands. With this type of brake it is therefore very difficult to adjust the tension of the line while the fish is being payed. Furthermore, it is also very difficult, when the brake is set, to reel in the fish as the fisherman must overcome the weight of the fish together with the drag of the brake upon the spool.

In order to overcome these problems, reels have been deviced wherein the reel crank may only be rotated in a direction calculated to reel in the line and where the brake is only effective upon the spool during the unreeling of the line therefrom. These reels of the last-mentioned type, however, have been of very complicated construction, and are therefore relatively expensive to manufacture and difficult and costly to maintain in perfect operating condition.

The present invention provides a reel of the last-mentioned type which is of relatively simple construction, and therefore is relatively inexpensive to manufacture and which may be easily and quickly disassembled for maintenance purposes.

The present invention furthermore provides a reel of the above type having a spool which is supported for rotation only at one end thereof, and which therefore permits free access to the line should the latter for any reason become entangled or snarled.

The present invention comprises a stationary frame connectable to a fishing rod, a cylindrical boss fixed to the frame, said boss having a free end, a spool having an elongated core, said core having an axial cylindrical recess opening at one end through and rotatably receiving the free end of the boss, said core also having an axial bore opening at said other end of the core and said interior end face, an elongated cylindrical sleeve rotatably extending through the bore for rotation relative to the spool, means for mounting the sleeve in fixed axial relationship to the core, a crank handle secured to the sleeve for rotating the latter, a drive shaft slidably but nonrotatably extending through the sleeve, said drive shaft having an inner end extending into the recess and an outer end extending outwardly of the end of the core opposite the recess, a frictional element non-rotatably carried by the drive shaft adjacent the inner end of the latter adapted for frictional engagement with said interior end face, axially movable adjusting means at the outer end of the drive shaft reactable against the sleeve for moving the shaft axially so as to move the friction element into and out of engagement with the interior end face of the core, and means on the shaft engageable with the boss for preventing rotation of the shaft in the unwinding direction.

In the drawings which illustrate the invention;
FIGURE 1 is a side view of the reel,
FIGURE 2 is a central sectional view taken along line 2—2 of FIGURE 1,
FIGURE 3 is an isometric view of a portion of the reel illustrating the connection with the sleeve and drive shaft, with portions removed from the sleeve for purpose of clarity, and
FIGURE 4 is a partial sectional view of the reel taken along line 4—4 of FIGURE 2.

Referring to the drawings, the reel comprises a disc-like side plate 10 at the periphery of which is connected a foot 11 for securing the reel in a known manner to a fishing rod, not shown. There is also provided an elongated generally cylindrical boss 13 having an outer threaded section 14 at one end 15, an elongated cylindrical intermediate portion 16 of larger diameter than said outer portion 14 so as to form a shoulder 17 which defines one end of said intermediate portion 16. At the outer end 19 of said intermediate portion and forming an integral part of the boss, is a large diameter disc 21, the peripheral edge of which is bent in a direction away from the first mentioned end of said intermediate portion 16 to form a rather wide annular flange 22. This flange is constituted as a pawl ring having formed on its radial innermost surface a plurality of ratchet teeth 24 which lie in concentric relationship to the axis of the boss. The side plate 10 is provided with a centrally located aperture 25 through which the outer threaded section 14 of the boss extends, a washer 26 being inserted between the shoulder 17 and said side plate, and secured thereagainst by a nut 27.

In order to maintain the boss 13 and side plate 10 in nonrotatable relationship, the threaded end portion 14 may be provided with a flattened section, not shown, which fittedly and nonrotatably engages a corresponding flattened portion, not shown, forming part of the aperture 25. This type of nonrotatable unison is well known and commonly used in the design and construction of machine parts, and is therefore not deemed necessary to illustrate or describe it in detail.

The reel is also provided with a spool 30, the latter having a large diameter cylindrical core or hub 31 having side plates 32 and 33 at either end thereof. The outer face 35 of side plate 32 is ground flat, while the outer face 36 of side plate 33 is formed having a centrally located raised portion 38, the latter being provided with a smoothly ground face 39 extending in the plane normal to the axis of the spool.

Formed centrally of the core 31 is a cylindrical recess 42 having a diameter slightly larger than the outside diameter of the disc 21, and having a depth approximately two-thirds the length of the core 31 terminating in a smoothly ground inner bearing face 44 which lies in the plane normal to the axis of the spool. The recess 42 is slightly larger in diameter for the substantially outermost half of its length than it is for the innermost half of its length so as to form an outwardly facing annular shoulder 45.

The spool is also provided with an axial bore 47 opening inwardly through face 39 and outwardly through outer face 36 of side plate 33, the inner end 48 of the bore being slightly countersunk. Rotatably fitted in the bore 47 is an elongated sleeve 50 having an inner flanged end 51 formed so as to have a snug yet rotatable fit with the countersunk end of the bore 47. The sleeve extends at its other or outer end 55 beyond the face 39 of the raised portion 38, the extending portion here being accorded the numeral 58 being slightly reduced in outer diameter to form an outwardly facing annular shoulder 59 and being externally threaded. A turning crank 61 having an internally threaded aperture 62 is threadedly engaged with the threaded extending portion 58, said crank being tightened down against the annular shoulder 59, and a washer 63 being inserted between the face 39 of the raised portion 38 and said crank. The crank is locked in place by means of a nut 65 threaded over said portion 58. The length of the sleeve 50 between its inner flanged end 51 and the annular shoulder 59 is slightly greater than the bore 47 so that when the crank 61 is tightened down against said annular shoulder 59 against the washer 53, a snug yet rotatable fit of the sleeve relative to the spool is achieved. This sleeve is also provided with a transversely extending slot 70 at substantially its middle length, said slot being slightly elongated longitudinally of the sleeve.

The spool is rotatably journalled to the boss 13 on a standard ball bearing assembly 75 of the type constructed to withstand thrust as well as to provide radial support having an inner race 76 and an outer race 77. The inner race 76 is press fitted over the intermediate section 16 of the boss and pressed tightly against the disc 21, the latter being slightly relieved where it lies adjacent the outer race so as to be spaced slightly outwardly therefrom. The outer race 76 of the ball bearing assembly snugly fits within the recess 42 and being of such a width, that when pressed against the annular shoulder 45, it will lie flush with the outer face 35 of side plate 32. It is to be also noted that with the spool thus positioned on the boss, the flange 22 is spaced from the bearing face 44.

Against the outer face 35 of side plate 32 is secured by machine screws 81 an annular plate 83. This plate, when drawn against said outer face 35 of said screws, presses against the outer race holding the latter firmly against said annular shoulder 45, thereby preventing axial movement of the spool relative to the boss. The plate is recessed adjacent the inner race of the bearing assembly to permit free rotation thereof. To the annular plate 83 is nonrotatably secured an annular toothed wheel 85 which is arranged to be engaged by a spring-urged dog 86 swingably and slidably connected to the side plate 10 for movement into and out of engagement with the wheel 85. This wheel and dog form a clicker mechanism common in reels, however, as it forms no part of the present invention, it is therefore neither fully illustrated nor fully described.

The sleeve 50 slidably supports an elongated cylindrical drive shaft 90, the latter slidably and rotatably extending at one end 91 into an axial located socket 92 formed in the face of the disc 21, and extending at its other end 93 outwardly beyond the end 55 of the sleeve 50. The shaft is maintained in non-rotative engagement with the sleeve 50 by means of a cross pin 94 suitably secured thereto and extending on opposite sides of the shaft into a slot 70, the length of the slot providing limited axial movement of said shaft relative to the sleeve.

Disposed in the recess 42 between the disc 21 and bearing face 44 is a friction element 95. This element is formed of a thin disc-like plate 96 nonrotatably and non- slidably connected to the shaft in a suitable manner and, having secured on its face confronting the bearing face 44, a suitable friction material 97 such as felt, leather or fiber as a suitable metallic material, and having on its opposite face a pivotally mounted pawl 99 which is normally urged into engagement with the teeth 24 of the flange 22 by a spring 100. The friction element 95 is free to move axially with the shaft into and out of engagement with the bearing face 44, the pawl being of sufficient thickness that it will remain in engagement with the teeth 24 during this latter movement. Referring to FIGURE 4, it will be appreciated that the engagement of the pawl 99 with the teeth will permit rotational movement of the drive shaft 90 only in one direction, that being in the direction of the rotation of the spool when reeling in the fishing line.

The axial movement of the shaft is controlled through the provision of a knurled nut 102 threaded on the threaded end 93 of the shaft and arranged to move a coil compression spring 103 into compressive engagement with the end 55 of the sleeve 50.

In the operation of the reel, the nut 102 may be tightened down against the compression spring 103 to move the latter against the sleeve 50. This will move the shaft and with it the frictional engagement member outwardly, bringing the latter into frictional engagement with the bearing face 44 thereof. As the friction element cannot rotate with the spool when the latter is rotated during the paying out of the line therefrom, a braking effect is thus achieved, said braking effect of course being easily adjusted by tightening or backing off the nut 102 until the right tension sufficient to tire a fighting fish is obtained. When it is desired to reel in the line, the nut may be further tightened down to increase the braking effect sufficiently to overcome the weight of the fish and the reel rotated by simply turning the crank. It will be seen that there is no braking effect on the spool during line retrieval as both the friction element 95 and spool rotate in unison. The angler therefore does not have to reel in both against a brake and against the weight of the fish.

Furthermore should the fish, during reeling in, suddenly run, the line will not be subject to tension greater than that determined by the brake setting. Reeling in action of the crank may therefore be continuous so as to take advantage of the fish at any time the tension on the line falls below the level determined by the brake setting.

It will also be seen that the construction of the reel as described leaves the spool entirely clear on one side so as to facilitate access to the line coiled thereupon should the latter for any reason become snarled or entangled.

Furthermore, it will be seen that the braking effect is achieved through axial compressive force exerted on the spool itself and not between the boss and the spool, thereby eliminating any forces which might tend to separate the latter two.

What I claim as my invention is:

1. A fishing reel comprising a stationary frame connectable to a fishing rod, a cylindrical boss fixed to the frame, said boss having a free end provided with an axial socket, a spool having an elongated core, said core having an axial cylindrical recess opening at one end thereof for rotatably receiving the free end of the boss, said recess terminating in an interior end face, an axial drive shaft rotatably and slidably extending through the core and into the socket, a frictional driving element non-rotatably carried by the shaft and located between the interior end face and the free end of the boss and for axial movement with the shaft into and out of frictional engagement with said interior end face, axially movable adjusting means on the shaft reactable against the spool for adjusting the axial disposition of the shaft relative to the spool, and engaging means on the shaft and boss for preventing rotation of the shaft in one direction.

2. A fishing reel as claimed in claim 1 in which the last-mentioned means comprises a pawl ring at the free end of the boss and a spring-urged pawl carried by the frictional element for engagement with the pawl ring.

3. A fishing reel comprising a stationary frame connectable to a fishing rod, a cylindrical boss fixed to the frame, said boss having a free end, a spool having an elongated core, said core having an axial cylindrical recess opening at one end thereof for rotatably receiving the free end of the boss, said recess terminating in an interior end face, said core also having an axial bore extending between said other end of the core and said interior end face, an elongated cylindrical sleeve rotatably extending through the bore for rotation relative to the spool, means for securing the sleeve in fixed axial relationship to the core, a crank handle secured to the sleeve for rotating the latter, a drive shaft slidably but non-rotatably extending through the sleeve, said drive shaft having an inner end extending into the recess and an outer end extending outwardly of the end of the core opposite the open end of the recess, a frictional element non-rotatably carried by the drive shaft adjacent the inner end of the latter adapted for frictional engagement with said interior end face, axially movable adjusting means at the outer end of the drive shaft reactable against the sleeve for moving the shaft axially so as to move the friction element into and out of engagement with the interior end face of the core, and engaging means on the shaft and boss for preventing rotation of the shaft in one direction.

4. A fishing reel as claimed in claim 3 in which the last-mentioned means comprises a ratchet at the free end of the boss and a spring-urged pawl carried by the frictional element for engagement with the ratchet.

5. A fishing reel as claimed in claim 3 wherein said adjusting means comprises a compression spring over the shaft at the outer end of the latter, and a nut threadedly engaged with the shaft for compressing the spring against the sleeve.

6. A fishing reel as claimed in claim 3 wherein the free end of the boss is provided with an axial socket for rotatably and slidably receiving the inner end of the drive shaft.

References Cited

UNITED STATES PATENTS

| | | | |
|---|---|---|---|
| 869,474 | 10/1907 | Atwood | 242—84.45 |
| 1,284,039 | 11/1918 | Atwood. | |
| 2,298,481 | 10/1942 | Hayes | 242—84.45 |
| 3,017,135 | 1/1962 | Wood | 242—84.54 |

FOREIGN PATENTS 134,629  10/1949  Australia.

BILLY S. TAYLOR, *Primary Examiner.*

U.S. Cl. X.R.

242—84.54